(12) United States Patent
Park et al.

(10) Patent No.: US 7,619,848 B2
(45) Date of Patent: Nov. 17, 2009

(54) METHOD OF SEARCHING TO FIND A SERVO PATTERN CORRESPONDING TO A SERVO PATTERN COPY PROCESS

(75) Inventors: Cheol-hoon Park, Yoning-si (KR); Ho-joon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/782,171

(22) Filed: Jul. 24, 2007

(65) Prior Publication Data

US 2008/0019033 A1    Jan. 24, 2008

(30) Foreign Application Priority Data

Jul. 24, 2006    (KR) ...................... 10-2006-0069273

(51) Int. Cl.
   *G11B 5/596*    (2006.01)
(52) U.S. Cl. ...................... 360/78.04; 360/75
(58) Field of Classification Search ........................ None
   See application file for complete search history.

(56) References Cited

U.S. PATENT DOCUMENTS 5,615,064 A * 3/1997 Blank et al. ................... 360/75
5,844,743 A * 12/1998 Funches ................... 360/78.04
6,697,207 B2 * 2/2004 Harmer ....................... 360/75
7,009,807 B1 * 3/2006 Hansen ..................... 360/78.04
7,209,321 B1 * 4/2007 Bennett ..................... 360/78.12
2001/0019463 A1   9/2001 Drouin
2002/0018313 A1   2/2002 Moon et al.
2002/0081106 A1 * 6/2002 Galbiati et al. .............. 388/800

FOREIGN PATENT DOCUMENTS

KR          2005-52600          6/2005

* cited by examiner

*Primary Examiner*—Jason C Olson
(74) *Attorney, Agent, or Firm*—Stanzione & Kim LLP (57) ABSTRACT

A method of searching to find a servo pattern corresponding to a servo pattern copy includes unparking a magnetic head and moving the magnetic head onto an intermediate area of a rotating disk, moving the magnetic head to a servo pattern copy start area by applying an initial search current to a voice coil of a voice coil motor (VCM), periodically measuring the speed of the magnetic head, controlling the speed of the magnetic head by adjusting a search current to the voice coil so that the speed of the magnetic head converges to a pre-set speed, and confirming the servo pattern recorded in the servo pattern copy start area using the magnetic head.

27 Claims, 8 Drawing Sheets

METHOD OF SEARCHING TO FIND A SERVO PATTERN CORRESPONDING TO A SERVO PATTERN COPY PROCESS

CROSS-REFERENCE TO RELATED APPLICATIONS

This application claims priority under 35 U.S.C. § 119(a) from Korean Patent Application No. 10-2006-0069273, filed on Jul. 24, 2006, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), and more particularly, to a method of searching to find a servo pattern recorded in a partial area of a disk in order to copy the servo pattern to another area of the disk.

2. Description of the Related Art

An HDD is a data storage device used in personal computers (PCs), MP3 players, mobile phones, etc. Data is recorded in concentric tracks on the surface of a magnetic disk, which is a data storage medium of the HDD. The disk is rotated at high speed by a spindle motor, and data is read and written by a magnetic head.

HDDs are manufactured through a mechanical assembly process, a servo write process, a function test process, and a burn-in test process, and are then available on the market after a final test process for checking whether defect correction is performed correctly. The mechanical assembly process is the process of assembling the mechanical parts of an HDD, the servo write process is the process of recording a servo pattern for servo control of an actuator on a disk, the function test process is the process of testing whether the combined mechanical and electrical parts of the HDD match each other and operate normally, and the burn-in test process is the process of searching for existing defects on the disk and allowing the defects to be avoided so that operational errors do not occur when the HDD operates.

In a conventional servo write process, a servo pattern is recorded in the entire recordable area of a disk using a servo writer. However, the conventional method takes a long time and is difficult to apply simultaneously to a plurality of HDDs, resulting in an increase of manufacturing cost. Thus, a method of recording a servo pattern in an entire recordable area of a disk by recording the servo pattern in a partial area of the disk using a servo writer, and copying the recorded servo pattern to a plurality of other recordable areas of the disk based on the original servo pattern has been developed. Hereinafter, a process of copying a servo pattern to a plurality of recordable areas based on a servo pattern recorded in a partial area is denoted as a servo pattern copy process, and the partial area is denoted as a servo pattern copy start area.

Figure 1:
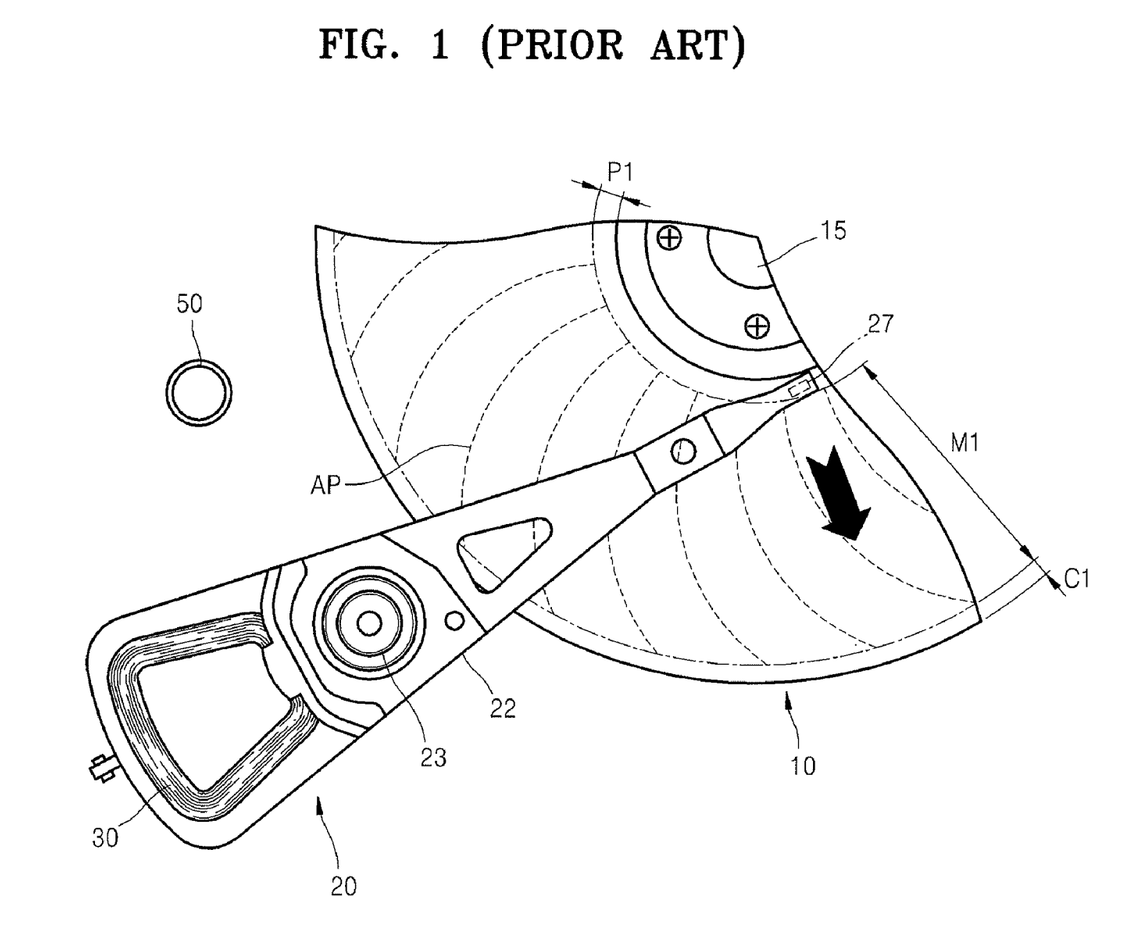
FIG. 1 is a diagram illustrating a conventional servo pattern search method corresponding to a servo pattern copy process.

FIG. 1 is a diagram illustrating a conventional servo pattern search method corresponding to a servo pattern copy.

Referring to FIG. 1, prior to the servo pattern copy process, a servo pattern is recorded in tracks of a partial area of a disk 10 using a servo writer, and a spiral seed pattern AP required to perform the servo pattern copy process is recorded on tracks of an intermediate area M1. The servo pattern is recorded in the area around the outer circumference of the disk 10, which is a servo pattern copy start area C1.

In order to perform the servo pattern copy process, when an HDD is turned on, a magnetic head embedded in a head slider 27 searches for the servo pattern recorded in the servo pattern copy start area C1, and if the servo pattern is found in the servo pattern copy start area C1, the magnetic head performs a servo pattern copy process to the intermediate area M1. The servo pattern search process is performed as follows. When a current is applied to a voice coil 30 of an actuator 20, a swing arm 22 of the actuator 20 rotates clockwise around a pivot bearing 23 so that the head slider 27 moves from a parking area P1 to the outer circumference of the disk 10, as illustrated by a large arrow in FIG. 1. Thereafter, the swing arm 22 rotates counter-clockwise at a sufficiently low angular speed so that the magnetic head embedded in the head slider 27 can search for the servo pattern while the head slider 27 slowly moves over the servo pattern copy start area C1 towards the inner circumference of the disk 10.

The current applied to the voice coil 30 is determined using an open loop control method. However, since the electrical characteristics of the parts of an HDD can vary slightly with manufacturing tolerances, the head slider 27 frequently moves at an inappropriate speed to search for the servo pattern, instead of moving at a set speed. This can cause the head slider 27 to contact and damage the disk 10 when the actuator 20 rapidly crashes into a crash stop 50, or may delay the servo pattern search process if the magnetic head moves over the servo pattern copy start area C1 too quickly or too slowly.

SUMMARY OF THE INVENTION

The present general inventive concept provides a servo pattern search method corresponding to a servo pattern copy procedure, wherein a current applied to a voice coil motor to move a magnetic head is controlled using a closed loop control method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing a method of searching to find a servo pattern corresponding to a servo pattern copy operation, the method including unparking a magnetic head and moving the magnetic head onto an intermediate area of a rotating disk, moving the magnetic head to a servo pattern copy start area by applying an initial search current to a voice coil of a voice coil motor (VCM), periodically measuring the speed of the magnetic head, controlling the speed of the magnetic head by adjusting a search current to the voice coil so that the speed of the magnetic head converges to a pre-set speed, and confirming the servo pattern recorded in the servo pattern copy start area using the magnetic head.

The measuring of the speed of the magnetic head and the adjusting of the search current based on the measured speed may be repeatedly performed until the servo pattern is read using the magnetic head.

The speed of the magnetic head may be measured using a back electromotive force of the VCM.

The back electromotive force of the VCM may be measured by measuring the voltage across the voice coil when the search current applied to the voice coil and a differential value of the current converge to 0.

The search current applied to the voice coil may be a pulse wave, and the back electromotive force of the VCM may be measured by measuring the voltage across the voice coil in periods between pulses.

The servo pattern copy start area may be located at an outer circumference of the disk, and the magnetic head may search for the servo pattern while moving from the inner circumference of the disk to the outer circumference of the disk.

In the method, the servo pattern copy start area may be located at an inner circumference of the disk, and the magnetic head may search for the servo pattern while moving from the outer circumference of the disk to the inner circumference of the disk.

The foregoing and/or other aspects and utilities of the present general inventive concept may also be achieved by providing a hard disk drive, including an actuator having a magnetic head, a driver to generate a search current to the actuator to move the magnetic head on the disk at a speed according to a magnitude of a search current from an intermediate area of the disk to a servo pattern copy start area of the disk, a detector to detect a movement speed and a position of the magnetic head and to output an adjustment signal based on the movement speed and position of the magnetic head, and a controller to adjust the magnitude of the search current based on the adjustment signal output from the detector.

The disk may include a parking area, and the driver may move the magnetic head from the parking area of the disk onto the intermediate area of the disk based on an unlatch current.

The driver may move the magnetic head to the servo pattern copy start area based on an initial search current.

The detector may detect the movement speed of the magnetic head when the magnetic head moves according to the initial search current controller.

The detector may detect the movement speed of the magnetic head when the controller adjusts the initial search current as the search current.

The actuator may further include a voice coil motor to induce a back electromotive force to correspond to the movement speed of the magnetic head.

The detector may detect the movement speed of the magnetic head by measuring the back electromotive force of the voice coil motor with regard to an angular speed of the actuator during rotation of the actuator.

The search current may be adjusted to cause the movement speed of the magnetic head to converge to a pre-set movement speed.

The magnitude of the search current is adjusted to accelerate the magnetic head if the movement speed of the magnetic head is slower than the pre-set movement speed, and the magnitude of the search current is adjusted to decelerate the magnetic head if the movement speed of the magnetic head is faster than the pre-set movement speed.

The foregoing and/or other aspects and utilities of the present general inventive concept may also be achieved by providing a method of searching to find a servo pattern corresponding to a servo pattern copy operation, the method including driving a magnetic head of an actuator on the disk at a speed based on a magnitude of a search current, detecting the movement speed and a position of the magnetic head, outputting an adjustment signal based on the movement speed and position of the magnetic head, and adjusting the magnitude of the search current based on the adjustment signal output from the detector.

The search current may be adjusted to cause the movement speed of the magnetic head to converge to a pre-set movement speed.

The magnitude of the search current may be adjusted to accelerate the magnetic head if the movement speed of the magnetic head is slower than the pre-set movement speed, and the magnitude of the search current is adjusted to decelerate the magnetic head if the movement speed of the magnetic head is faster than the pre-set movement speed.

The foregoing and/or other aspects and utilities of the present general inventive concept may also be achieved by providing a computer readable recording medium having embodied thereon a computer program to execute a method, wherein the method includes unparking a magnetic head and moving the magnetic head onto an intermediate area of a rotating disk, moving the magnetic head to a servo pattern copy start area by applying an initial search current to a voice coil of a voice coil motor (VCM); periodically measuring the speed of the magnetic head, controlling the speed of the magnetic head by adjusting a search current to the voice coil so that the speed of the magnetic head converges to a pre-set speed, and confirming the servo pattern recorded in the servo pattern copy start area using the magnetic head.

The foregoing and/or other aspects and utilities of the present general inventive concept may also be achieved by providing a computer readable recording medium having embodied thereon a computer program to execute a method, wherein the method includes driving a magnetic head of an actuator on the disk at a speed based on a magnitude of a search current, detecting the movement speed and a position of the magnetic head, outputting an adjustment signal based on the movement speed and position of the magnetic head, and adjusting the magnitude of the search current based on the adjustment signal output from the detector.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
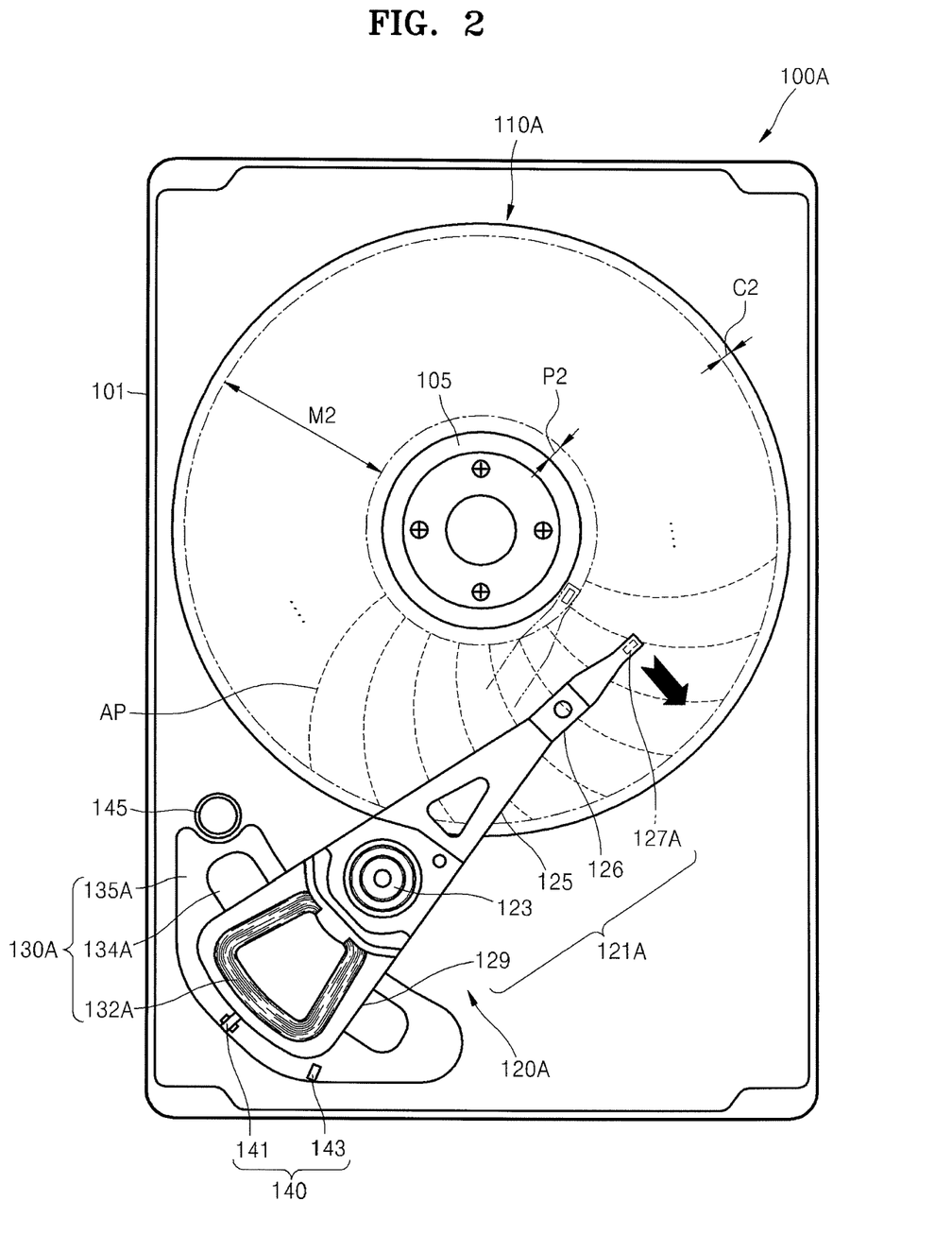
FIG. 2 is a diagram illustrating a movement of a magnetic head when a servo pattern search method corresponding to a servo pattern copy process is performed according to an embodiment of the present general inventive concept.
Figure 3:
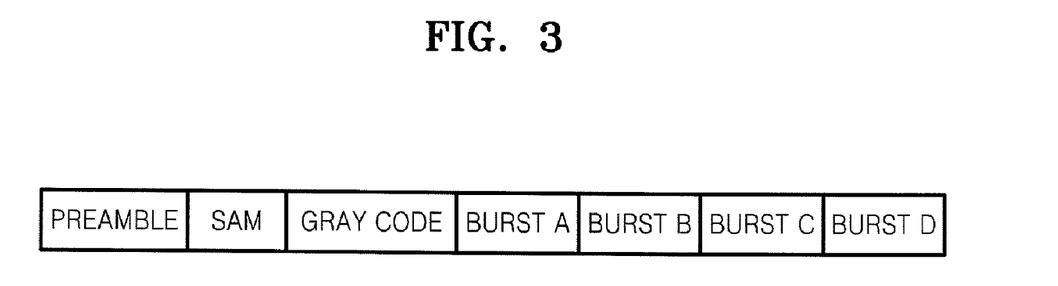
FIG. 3 illustrates a servo pattern recorded in a track of a disk.
Figure 4:
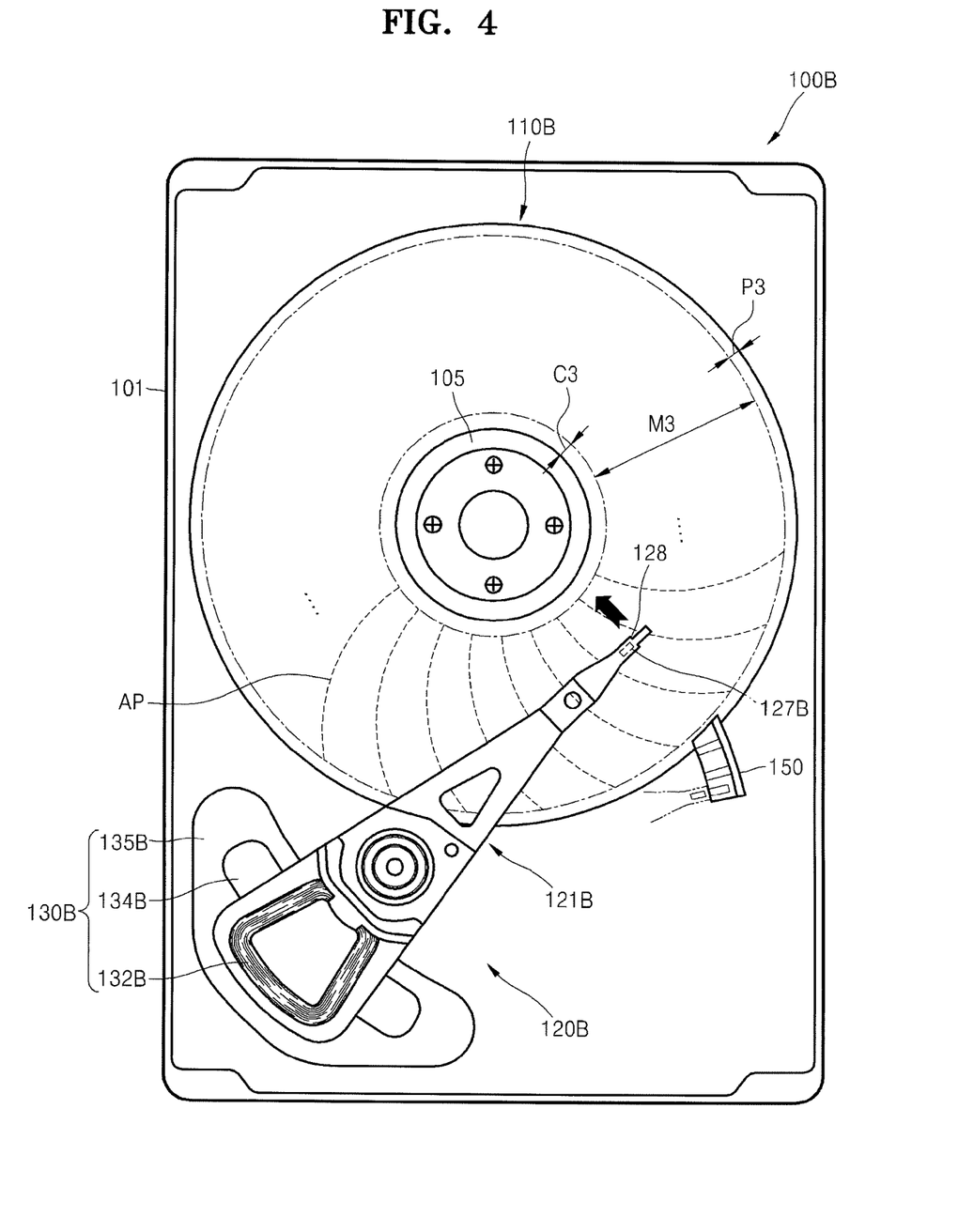
FIG. 4 is a diagram illustrating movement of a magnetic head when a servo pattern search method corresponding to a servo pattern copy process is performed according to another embodiment of the present general inventive concept.
Figure 5:
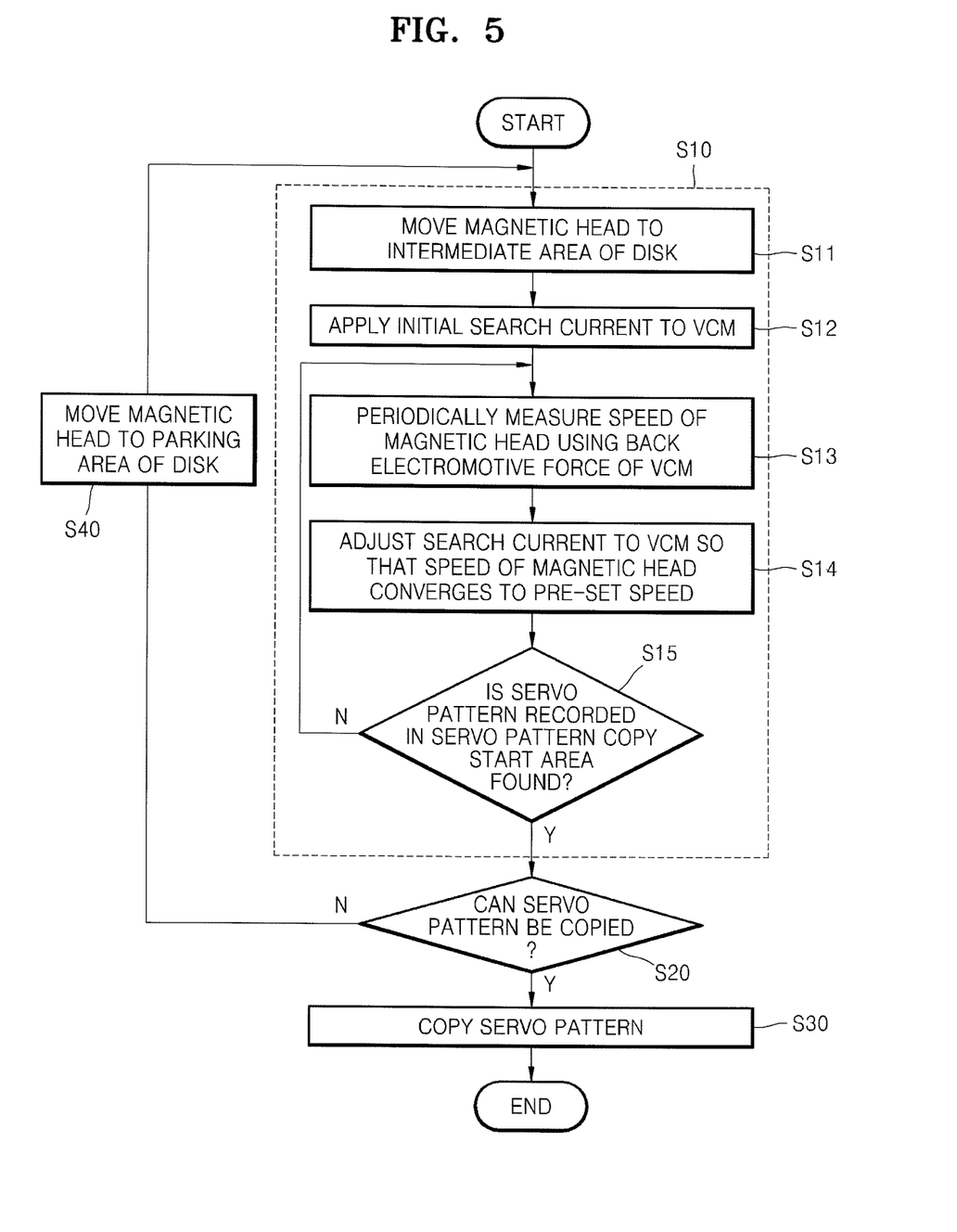
FIG. 5 is a flowchart illustrating a servo pattern copy process including a servo pattern search method according to an embodiment of the present general inventive concept.

FIG. 2 is a diagram illustrating a movement of a magnetic head when a servo pattern search method corresponding to a servo pattern copy process is performed according to an embodiment of the present general inventive concept, FIG. 3 illustrates a servo pattern recorded in a track of a disk, FIG. 4 is a diagram for describing the movement of a magnetic head when a servo pattern search method corresponding to a servo pattern copy process is performed according to another embodiment of the present general inventive concept, and FIG. 5 is a flowchart illustrating a servo pattern copy process including a servo pattern search method according to an embodiment of the present general inventive concept.

Before a servo pattern search method according to an embodiment of the present general inventive concept is described, a structure of an HDD will be described. An HDD can use either a Constant Start Stop (CSS) method or a ramp parking method of an actuator. The CSS method parks a head slider at an inner circumference of a disk, and an HDD 100A illustrated in FIG. 2 uses the CSS method. In contrast, the ramp parking method parks a head slider on a ramp outside the disk, and an HDD 100B illustrated in FIG. 4 uses the ramp parking method.

Referring to FIG. 2, the HDD 100A which uses the CSS method, includes a spindle motor 105, a disk 110A that is a data storage medium, and an actuator 120A to write information or to read recorded information by moving a magnetic head onto a specific track of the disk 110A. These parts are contained in a housing (not illustrated) including a base member 101 and a cover member (not illustrated) assembled with the base member 101.

The spindle motor 105 rotates the disk 110A at a high speed and is mounted on the base member 101. The disk 110A is mounted on the spindle motor 105 and is rotated at a high speed by the spindle motor 105. The disk 110A includes a parking area P2 at its inner circumference adjacent to the spindle motor 105, a servo pattern copy start area C2 at its outer circumference, and an intermediate area M2 between the parking area P2 and the servo pattern copy start area C2. The parking area P2 is an area in which a head slider 127A is parked when the HDD 100A is turned off, and is also a non-recordable area which contains no data or tracks.

The servo pattern copy start area C2 is an area in which a servo pattern is recorded in advance using a servo writer, prior to a servo pattern copy process. In FIG. 2, a width of the servo pattern copy start area C2 is exaggerated when compared to a width of a servo pattern copy start area of a real disk. If it is assumed that approximately 180,000 tracks are formed on a typical 3.5-inch diameter disk, the servo pattern is recorded in advance on approximately the first 5,400 tracks beginning from an outer circumference of the disk, which can be identified as the servo pattern copy start area C2. A spiral seed pattern AP required to perform the servo pattern copy process is recorded on tracks of an intermediate area M2 using the servo writer.

Referring to FIG. 3, the servo pattern recorded in the servo pattern copy start area C2 can include, for example, a preamble, a Servo Address Mark (SAM), a gray code, and bursts A, B, C, and D. The preamble is a start signal of the servo pattern, which is used to correctly detect the servo pattern, the SAM is a signal to perform system synchronization, the gray code is a signal containing ID information to identify tracks and/or common track numbers, and the bursts A, B, C, and D are signals used to perform track following.

Referring back to FIG. 2, the actuator 120A includes a head stack assembly (HSA) 121A, on an edge of which is mounted the head slider 127A, and which is rotatably assembled on the base member 101, a voice coil motor (VCM) 130A providing torque to rotate the HSA 121A, and a magnetic latch 140 to hold the HSA 121A when the head slider 127A is parked in the parking area P2.

The HSA 121A includes a swing arm 125 which is rotatably assembled on the base member 101 around a pivot bearing 123, a suspension 126 which is attached to one edge of the swing arm 125, the head slider 127A which is attached to one edge of the suspension 126, and an overmold 129 protrudes in a direction opposite to the suspension 126, based on the pivot bearing 123. A magnetic head to write information to the disk 110A or to read information from the disk 110A is embedded in the head slider 127A.

When the disk 110A rotates at a high speed, lift is exerted on the head slider 127A. The head slider 127A may float at a height which balances both the lift and an elastic pressing force of the suspension 126 towards the disk 110A. While floating, the magnetic head can write information to or read information from tracks of the disk 110A.

The VCM 130A includes a voice coil 132A which is mounted on the overmold 129, a pair of magnets 134A above and under the voice coil 132A, and a pair of yokes 135A to support the magnets 134A. The HSA 121A rotates in a direction according to Fleming's left-hand law, based on an interaction between a current input to the voice coil 132A and a magnetic field of the magnets 134A.

The magnetic latch 140 includes a magnetic protrusion 141 which is located on the overmold 129 and contains a ferromagnetic substance or a magnet, and a magnetic stopper 143 which also contains a ferromagnetic substance or a magnet, and is thus magnetically attracted to the magnetic protrusion 141. The magnetic stopper 143 protrudes from the yoke 135A. When the HSA 121A rotates counter-clockwise around the pivot bearing 123, if the magnetic protrusion 141 contacts the magnetic stopper 143, the HSA 121A cannot rotate further counter-clockwise, and the head slider 127A is parked in the parking area P2 of the disk 110A, illustrated with a dot-dash line in FIG. 3. Since the magnetic protrusion 141 is kept in contact with the magnetic stopper 143 by magnetic force, undesired rotation of the HSA 121A due to disturbance is prevented.

Reference numeral 145 indicates a crash stop to limit clockwise rotation of the HSA 121A. That is, the HSA 121A can rotate clockwise until the overmold 129 contacts the crash stop 145.

Referring to FIG. 4, an HDD 100B which uses the ramp parking method above includes a spindle motor 105, a disk 110B that is a data storage medium, an actuator 120B having a magnetic head, and a ramp 150 outside the disk 110B. These parts are contained in a housing (not illustrated) including a base member 101 and a cover member (not illustrated) assembled with the base member 101.

Unlike the disk 110A illustrated in FIG. 2, the disk 110B includes a servo pattern copy start area C3 at its inner circumference adjacent to the spindle motor 105, an intermediate area M3 outside the servo pattern copy start area C3, and a parking area P3 at its outer circumference overlapping the ramp 150. The servo pattern copy start area C3 is an area in which a servo pattern is recorded in advance using a servo writer prior to a servo pattern copy process. In FIG. 4, a width of the servo pattern copy start area C3 is exaggerated as when compared to a width of a servo pattern copy start area of a real disk. A spiral seed pattern AP which is required to perform the servo pattern copy process is recorded on tracks of the intermediate area M3 using the servo writer. The parking area P3 is a non-recordable area in which no data can be recorded since the parking area P3 overlaps the ramp 150 on which a magnetic head is parked. Since the servo pattern recorded in the servo pattern copy start area C3 is the same as that which was described with reference to FIG. 3, its description will not be repeated.

The actuator 120B includes an HSA 121B which is rotatably assembled with the base member 101, and a VCM 130B which provides torque to rotate the HSA 121B. The head slider 127B is mounted on one edge of the HSA 121B. A magnetic head to write information to or to read information from the disk 110B is embedded in the head slider 127B.

An end tap 128 is located at the edge of the HSA 121B and is supported by the ramp 150 when the head slider 127B rotates clockwise outside the outer circumference of the disk 110B. If the end tap 128 is supported by the ramp 150 as illustrated with a dot-dash line in FIG. 4, the HSA 121B does not rotate due to disturbance.

Like the VCM 130A illustrated in FIG. 2, the VCM 130B includes a voice coil 132B, a pair of magnets 134B which are each located above and under the voice coil 132B, and a pair of yokes 135B to support the magnets 134B. The HSA 121B rotates in a direction according to Fleming's left-hand law, based on an interaction between a current input to the voice coil 132B and a magnetic field of the magnets 134B.

Referring to FIGS. 2 and 5, the servo pattern copy process in the HDD 100A which uses the CSS method includes the magnetic head to perform a searching operation to find the servo pattern recorded in the servo pattern copy start area C2 in operation S10 (a servo pattern search process) and to perform a servo pattern copy to the intermediate area M2 of the disk 110A if the servo pattern is found in the servo pattern copy start area C2.

The servo pattern search process (i.e., operation S10) is performed as follows. In operation S11, the magnetic head, i.e. the head slider 127A, is unparked from the parking area P2 illustrated in FIG. 2 with a dot-dash line, and is moved to the intermediate area M2. Accordingly, an unlatch torque must be applied to the HSA 121A to separate the magnetic protrusion 141 from the magnetic stopper 143 and to move the head slider 127A to the intermediate area M2 by rotating the HSA 121A clockwise. An unlatch current must be input to the voice coil 132A of the VCM 130A to generate the unlatch torque.

The unlatch current can be set prior to the servo pattern search process (i.e., operation S10). Although the electrical characteristics of the parts of the HDD 100A may vary, a width of the intermediate area M2 is sufficiently large that if the pre-set unlatch current is input to the voice coil 132A, the head slider 127A reliably arrives in the intermediate area M2.

In operation S12, an initial search current is input to the voice coil 132A of the VCM 130A to move the magnetic head to the servo pattern copy start area C2, outwards from an inner circumference of the disk 110A as illustrated in FIG. 2 by an arrow. The initial search current is also set prior to the servo pattern search process (i.e., operation S10). As described above, since the electrical characteristics of the parts of the HDD 100A may vary slightly, an actual speed of the magnetic head due to the initial search current may be faster or slower than an expected search speed of the magnetic head, e.g. 1.5 inch/sec (ips).

In operation S13, the speed of the magnetic head is periodically measured to perform closed loop control of the speed of the magnetic head. Since the servo pattern is not recorded in the intermediate area M2, the speed of the magnetic head is measured using back electromotive force induced by the voice coil 132A of the VCM 130A. In detail, an angular speed of the rotating HSA 121A is proportional to the back electromotive force induced by the voice coil 132A. Thus, if the back electromotive force is measured, the angular speed of the HSA 121A can be measured, and thereby the speed of the magnetic head can be measured. The voltage V across the voice coil 132A can be represented by Equation 1 as follows.

[EQUATION 1]

$$V = RI + L\frac{dI}{dt} + Bemf \qquad (1)$$

Here, V denotes voltage across the voice coil 132A, I denotes current input to the voice coil 132A, R denotes resistance of the voice coil 132A, L denotes inductance of the voice coil 132A, and Bemf denotes back electromotive force induced in the voice coil 132A. Equation 1 illustrates that the back electromotive force Bemf can be measured by measuring the voltage V across the voice coil 132A when the current I input to the voice coil 132A and a differential value dI/dt of the current I converge to 0.

A pulse wave signal is usually input to the voice coil 132A to control the angular speed of the rotating HSA 121A. Thus, since the current I and the differential value dI/dt converge to 0 in the periods between pulses, the back electromotive force Bemf can be measured by measuring the voltage V across the voice coil 132A.

In operation S14, the speed of the magnetic head is controlled by applying an adjusted search current to the voice coil 132A so that the periodically measured speed of the magnetic head converges to a pre-set speed. Since the angular speed of the rotating HSA 121A and the speed of the magnetic head can be measured using the back electromotive force Bemf, if the speed of the magnetic head is faster than the pre-set speed, e.g. 1.5 ips, the search current is modulated to slow the magnetic head. If the speed of the magnetic head is slower than the pre-set speed, the search current is modulated to accelerate the magnetic head. As described above, since the pulse wave signal is input to the voice coil 132A, the search current can be modulated by modulating a pulse width or a pulse amplitude of the search current.

In operation S15, it is determined whether the servo pattern recorded in the servo pattern copy start area C2 is found using the magnetic head. The measuring of the speed of the magnetic head (i.e., operation S13) and the applying of the search current adjusted based on the measured speed (i.e., operation S14) are repeatedly performed until the servo pattern recorded in the servo pattern copy start area C2 is found using the magnetic head. Thus, since the speed of the magnetic head is controlled using the closed loop control method, the speed of the magnetic head converges to the pre-set speed.

If the servo pattern recorded in the servo pattern copy start area C2 is found through the servo pattern search process (i.e., operation S10), it is determined in operation S20 whether the servo pattern can be copied to the intermediate area M2. For example, if a position error signal (PES) is generated due to disturbance or a disk malfunction after the servo pattern is found, it is determined that the servo pattern cannot be copied to the intermediate area M2. If it is determined in operation S20 that the servo pattern can be copied to the intermediate area M2, the servo pattern is copied to the intermediate area M2 in operation S30. In contrast, if it is determined in operation S20 that the servo pattern cannot be copied to the intermediate area M2, the magnetic head is moved back to the parking area P2 in operation S40, and the servo pattern search process (i.e., operation S10) is performed again.

Referring to FIGS. 4 and 5, the servo pattern search process (i.e., operation S10) of the HDD 100B using the ramp parking method, in which the servo pattern recorded in the servo pattern copy start area C3 is searched prior to the servo pattern copy process (i.e., operation S10), is performed while the HSA 121B rotates counter-clockwise and the magnetic head, i.e. the head slider 127B, moves inwards to the inner circumference of the disk 110B, in a direction opposite to that of the HDD 100A using the CSS method illustrated in FIG. 2. The servo pattern search process (i.e., operation S10) will now be described. In operation S11, the HSA 121B is unparked, and the magnetic head is moved to the intermediate area M3. Accordingly, a pre-set unlatch current is input to the voice coil 132B to generate an unlatch torque sufficient to separate the end tap 128 of the HSA 121B from the ramp 150 and move the head slider 127B to the intermediate area M3.

In operation S12, a pre-set initial search current is input to the voice coil 132B of the VCM 130B to allow the magnetic head to move to the servo pattern copy start area C3. In operation S13, the speed of the magnetic head is periodically measured using the back electromotive force induced by the voice coil 132B of the VCM 130B. In operation S14, the speed of the magnetic head is controlled by adjusting the search current to the voice coil 132B so that the speed of the magnetic head converges to a pre-set speed. In operation S15, it is determined whether the servo pattern recorded in the servo pattern copy start area C3 is found using the magnetic head. The measuring of the speed of the magnetic head (i.e., operation S13) and the adjusting of the search current based on the measured speed (i.e., operation S14) are repeatedly performed until the servo pattern recorded in the servo pattern copy start area C3 is found using the magnetic head.

Although the servo pattern search process of the HDD 100B using the ramp parking method has been described mainly in terms of its differences from the pattern search process of the HDD 100A using the CSS method, it will be understood by those of ordinary skill in the art that the servo pattern search process of the HDD 100B using the ramp parking method can be deduced in detail from the servo pattern search process of the HDD 100A using the CSS method.

Figure 6:
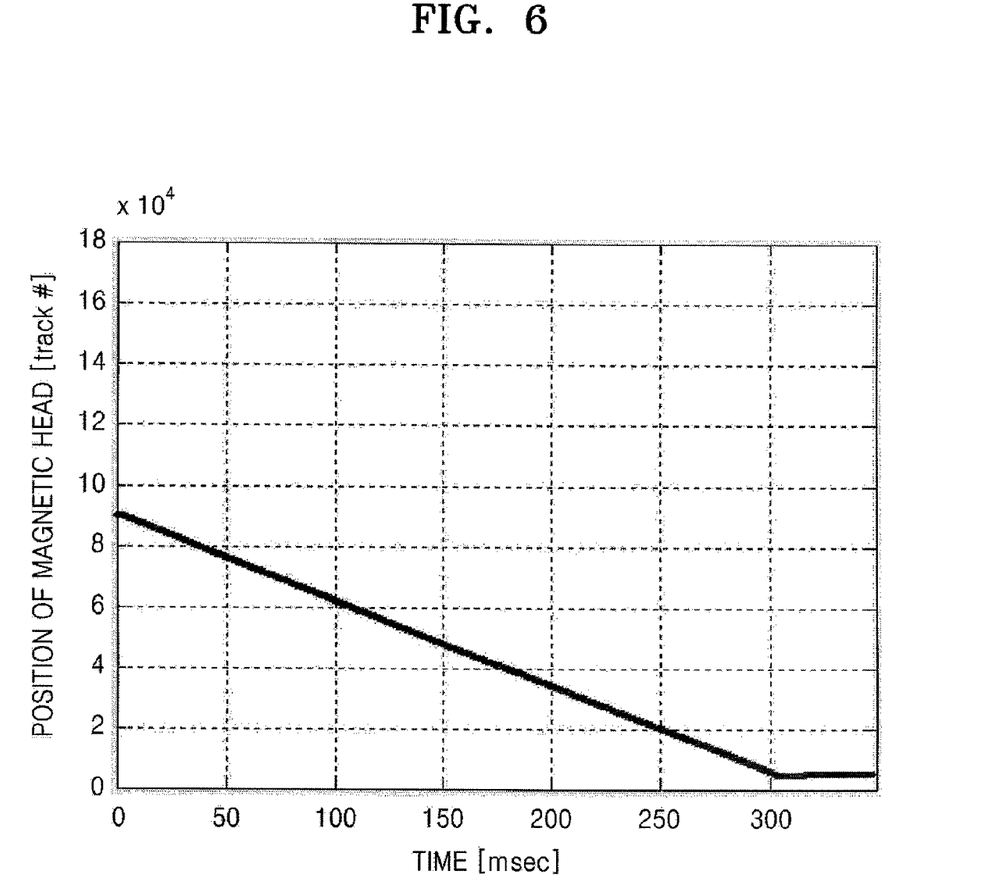
FIG. 6 is a graph illustrating a correlation between time and a position of a magnetic head when a speed of the magnetic head is controlled using a back electromotive force of a VCM after unlatching, according to an embodiment of the present general inventive concept.
Figure 7:
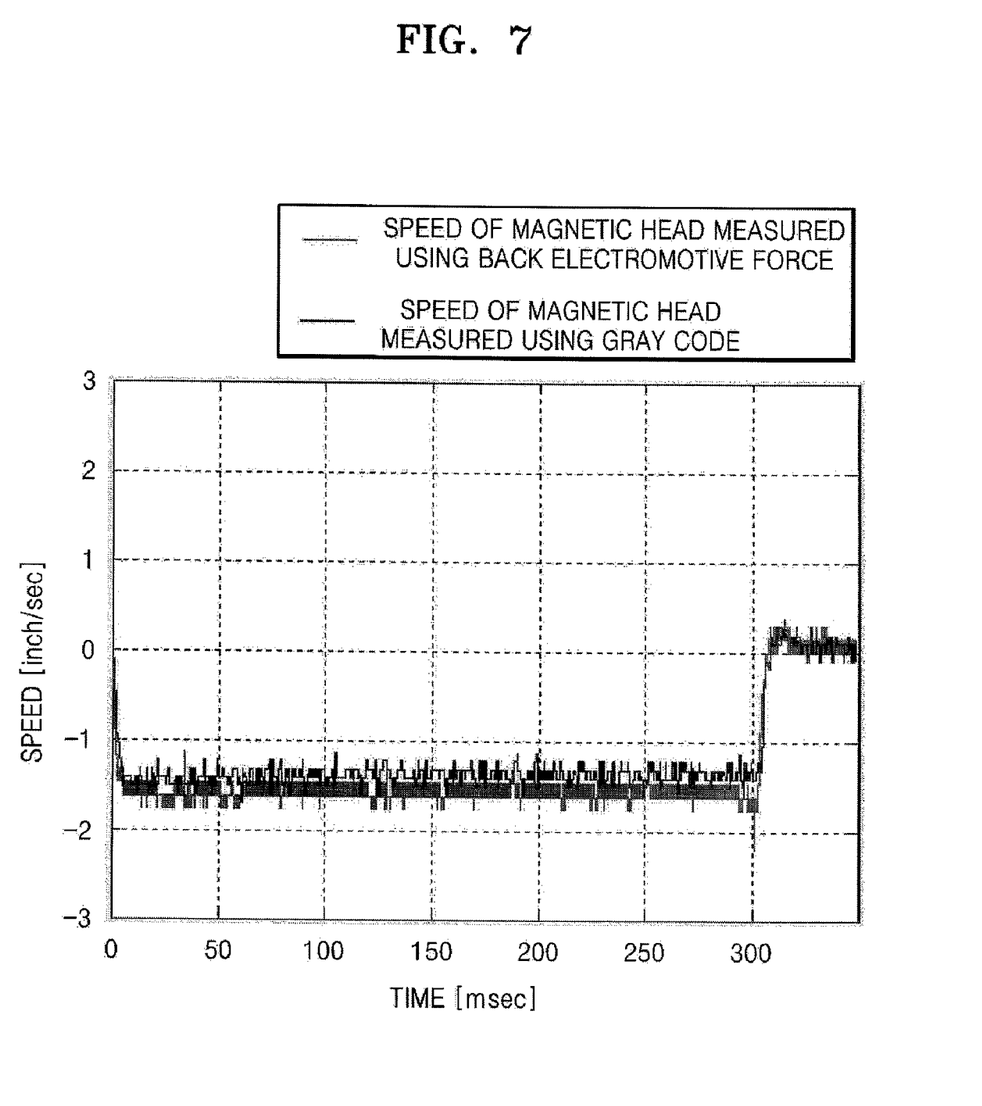
FIG. 7 is a graph illustrating a comparison of speeds of a magnetic head according to time when a speed of the magnetic head is controlled using a back electromotive force of a VCM and a gray code of a servo pattern after unlatching, according to an embodiment of the present general inventive concept.

FIG. 6 is a graph illustrating the correlation between time and a position of a magnetic head when a speed of the magnetic head is controlled using back electromotive force of a VCM after unlatching, according to an embodiment of the present general invention concept, and FIG. 7 is a graph showing a comparison of speeds of a magnetic head according to time when a speed of the magnetic head is controlled using back electromotive force of a VCM and a gray code of a servo pattern after unlatching, according to an embodiment of the present general inventive. Various experiments were performed using an HDD having a 3.5-inch diameter disk, and a magnetic head search speed of −1.5 ips. The negative (−) sign denotes that the magnetic head moves outwards from the inner circumference of the disk. Track number 1 is at the outermost circumference of the disk, and track number 180,000 is at the innermost circumference of the disk.

Referring to FIGS. 6 and 7, when the speed of the magnetic head is controlled by means of the closed loop control method using the back electromotive force of the VCM as described above with reference to FIG. 5, the magnetic head moves from an intermediate area (M2 of FIG. 2) of the disk to a servo pattern copy start area (C2 of FIG. 2) at the outer circumference of the disk at a constant speed similar to the pre-set search speed of −1.5 ips. This result is very constant compared to when the speed of the magnetic head is controlled by means of the closed loop control method using a track number contained in the gray code. However, in a real servo pattern search process corresponding to a servo pattern copy, the gray code is not recorded in the intermediate area (M2 of FIG. 2) of the disk. The experiments prove that it is reliable to control the speed of the magnetic head using the back electromotive force of the VCM. From when the magnetic head begins to follow tracks in the servo pattern copy start area (C2 of FIG. 2) of the disk, the speed of the magnetic head is maintained at 0 ips.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The computer-readable transmission medium can transmit carrier waves (such as wired or wireless data transmission through the Internet). Also, functional programs, codes, and code segments to accomplish the present general inventive concept can be easily construed by programmers skilled in the art to which the present general inventive concept pertains.

Figure 8:
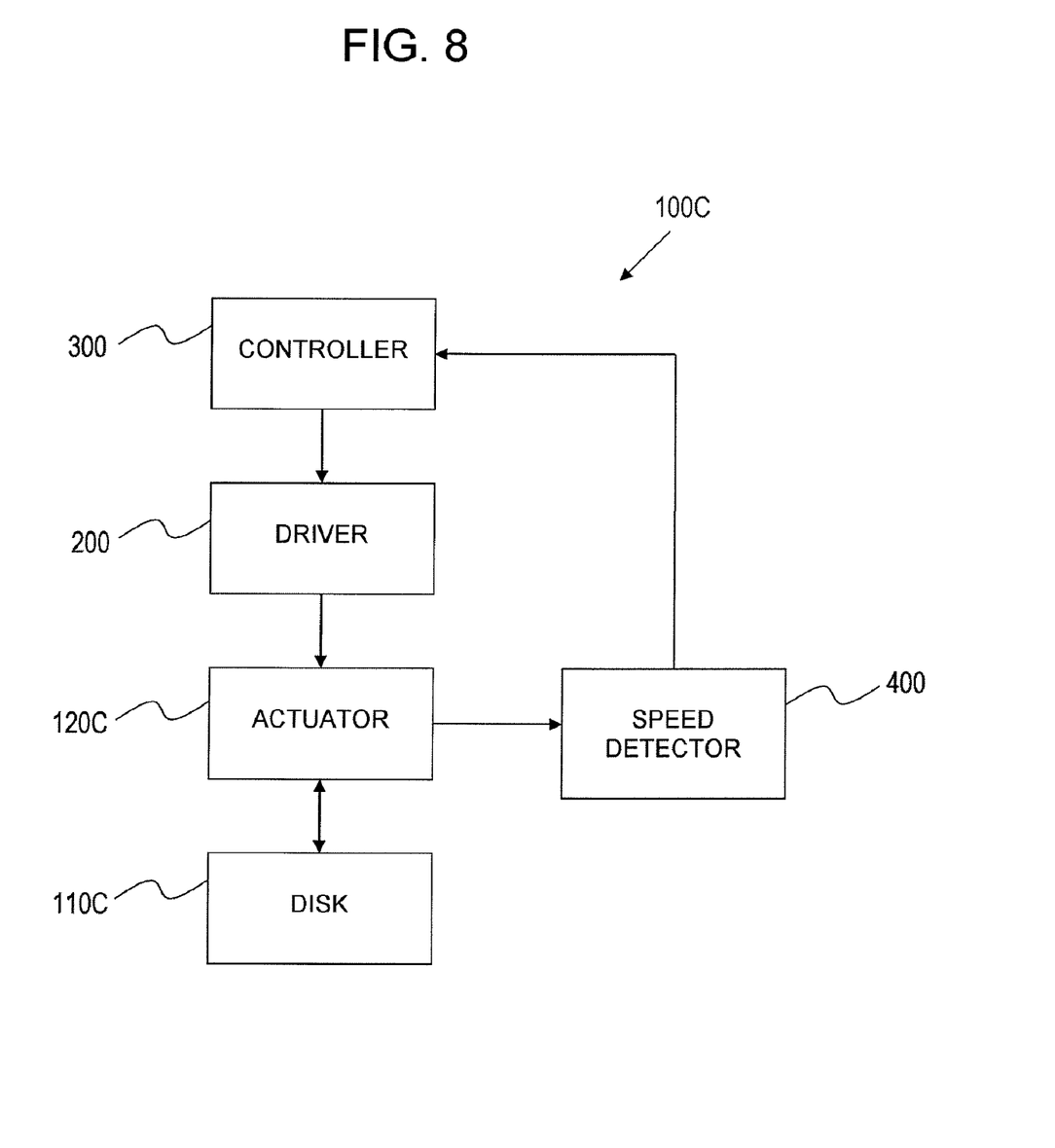
FIG. 8 is a block diagram illustrating a block diagram of a hard disk drive according to another embodiment of the present general inventive concept.

Referring to FIG. 8, a block diagram of a hard disk drive (HDD) 100C according to another embodiment of the present general inventive concept is illustrated. An actuator 120C is formed on the HDD 100C to rotate, and includes a magnetic head to perform a servo pattern copy process on a disk 110C. Also, a driver 200 is included in the HDD 100C to move the magnetic head on the disk 110C at a speed based on a magnitude of a search current. A speed detector 400 is also included to detect the movement speed and a position of the magnetic head and to output an adjustment signal based on the movement speed and position of the magnetic head. Finally, a controller 300 can adjust the magnitude of the search current based on the adjustment signal output from the speed detector 400. The block diagram of the HDD 100C may be used to control the HDD 100A of FIG. 2 and the HDD 100B of FIG. 4. Also, the block diagram of the HDD 100C may perform the operation of the method illustrated in FIG. 5.

As described above, according to the present general inventive concept, since a speed of a magnetic head in a direction of a servo pattern copy start area is controlled using a closed loop control method, damage to a disk due to the magnetic head crashing, which may occur in a servo pattern search process, is reduced.

In addition, since a servo pattern is found more quickly and reliably than in the prior art, a servo pattern copy process can also be performed quickly and reliably, thereby reducing manufacturing costs of HDDs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of searching to find a servo pattern corresponding to a servo pattern copy operation, the method comprising:
   unparking a magnetic head and moving the magnetic head onto an intermediate area of a rotating disk;
   moving the magnetic head to a servo pattern copy start area by applying an initial search current to a voice coil of a voice coil motor (VCM);
   periodically measuring the speed of the magnetic head;
   controlling the speed of the magnetic head by adjusting a search current to the voice coil according to the measured speed and the speed corresponding to the initial search current so that the measured speed of the magnetic head converges to a pre-set speed; and
   confirming the servo pattern recorded in the servo pattern copy start area using the magnetic head,
   wherein the speed of the magnetic head is measured using a back electromotive force of the VCM, and the back electromotive force of the VCM is measured by measuring a voltage across the voice coil when the search current applied to the voice coil and a differential value of the current converge to 0.

2. The method of claim 1, wherein the measuring of the speed of the magnetic head and the adjusting of the search current based on the measured speed are repeatedly performed until the servo pattern is confirmed using the magnetic head.

3. A method of searching to find a servo pattern corresponding to a servo pattern copy operation, the method comprising:
   unparking a magnetic head and moving the magnetic head onto an intermediate area of a rotating disk;
   moving the magnetic head to a servo pattern copy start area by applying an initial search current to a voice coil of a voice coil motor (VCM);
   periodically measuring the speed of the magnetic head;
   controlling the speed of the magnetic head by adjusting a search current to the voice coil according to the measured speed and the speed corresponding to the initial search current so that the measured speed of the magnetic head converges to a pre-set speed; and
   confirming the servo pattern recorded in the servo pattern copy start area using the magnetic head,
   wherein the speed of the magnetic head is measured using a back electromotive force of the VCM, and the search current applied to the voice coil is a pulse wave, and the back electromotive force of the VCM is measured by measuring a voltage across the voice coil in periods between pulses.

4. The method of claim 1, wherein the servo pattern copy start area is located at an outer circumference of the disk, and the magnetic head searches to find the servo pattern while moving from the inner circumference of the disk to the outer circumference of the disk.

5. The method of claim 1, wherein the servo pattern copy start area is located at an inner circumference of the disk, and the magnetic head searches to find the servo pattern while moving from the outer circumference of the disk to the inner circumference of the disk.

6. A hard disk drive, comprising:
   an actuator having a magnetic head;
   a driver to generate a search current to the actuator to move the magnetic head on a disk at a speed according to a magnitude of a search current from an intermediate area of the disk to a servo pattern copy start area of the disk;
   a detector to detect a movement speed and a position of the magnetic head and to output an adjustment signal based on the movement speed and position of the magnetic head and the speed corresponding to the search current; and
   a controller to adjust the magnitude of the search current based on the adjustment signal output from the detector such that the movement speed converges to a pre-set speed,
   wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

7. The hard disk drive of claim 6, wherein the disk comprises a parking area, and the driver moves the magnetic head from the parking area of the disk onto the intermediate area of the disk based on an unlatch current.

8. The hard disk drive of claim 7, wherein the driver moves the magnetic head to the servo pattern copy start area based on an initial search current.

9. The hard disk drive of claim 8, wherein the detector detects the movement speed of the magnetic head when the magnetic head moves according to the initial search current controller.

10. The hard disk drive of claim 9, wherein the detector detects the movement speed of the magnetic head when the controller adjusts the initial search current as the search current.

11. The hard disk drive of claim 6, wherein the actuator further comprises:
    a voice coil motor to induce a back electromotive force to correspond to the movement speed of the magnetic head.

12. The hard disk drive of claim 9, wherein the detector detects the movement speed of the magnetic head by measuring the back electromotive force of the voice coil motor with regard to an angular speed of the actuator during rotation of the actuator.

13. The hard disk of claim 6, wherein the search current is adjusted to cause the movement speed of the magnetic head to converge to a pre-set movement speed.

14. The hard disk of claim 11, wherein:
    the magnitude of the search current is adjusted to accelerate the magnetic head if the movement speed of the magnetic head is slower than the pre-set movement speed; and
    the magnitude of the search current is adjusted to decelerate the magnetic head if the movement speed of the magnetic head is faster than the pre-set movement speed.

15. A method of searching to find a servo pattern corresponding to a servo pattern copy operation, the method comprising:
    driving a magnetic head of an actuator on a disk at a speed based on a magnitude of a search current;
    detecting the movement speed and a position of the magnetic head;
    outputting an adjustment signal based on the movement speed and position of the magnetic head and the speed corresponding to the search current; and
    adjusting the magnitude of the search current based on the adjustment signal output from the detector such that the movement speed converges to a pre-set speed,
    wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

16. The method of claim 15, wherein the search current is adjusted to cause the movement speed of the magnetic head to converge to the pre-set movement speed within a servo pattern area of the disk.

17. The method of claim 15, wherein:
the magnitude of the search current is adjusted to accelerate the magnetic head if the movement speed of the magnetic head is slower than the pre-set movement speed; and
the magnitude of the search current is adjusted to decelerate the magnetic head if the movement speed of the magnetic head is faster than the pre-set movement speed.

18. A computer readable recording medium having embodied thereon a computer program to execute a method, wherein the method comprises:
unparking a magnetic head and moving the magnetic head onto an intermediate area of a rotating disk;
moving the magnetic head to a servo pattern copy start area by applying an initial search current to a voice coil of a voice coil motor (VCM);
periodically measuring the speed of the magnetic head;
controlling the speed of the magnetic head by adjusting a search current to the voice coil according to the measured speed and the speed corresponding to the initial search current so that the speed of the magnetic head converges to a pre-set speed; and
confirming the servo pattern recorded in the servo pattern copy start area using the magnetic head,
wherein the speed of the magnetic head is measured using a back electromotive force of the VCM, and the back electromotive force of the VCM is measured by measuring a voltage across the voice coil when the search current applied to the voice coil and a differential value of the current converge to 0.

19. A computer readable recording medium having embodied thereon a computer program to execute a method, wherein the method comprises:
driving a magnetic head of an actuator on the disk at a speed based on a magnitude of a search current in a servo pattern copy operation;
detecting the movement speed and a position of the magnetic head;
outputting an adjustment signal based on the movement speed and position of the magnetic head and the speed corresponding to the search current; and
adjusting the magnitude of the search current based on the adjustment signal output from the detector such that the movement speed converges to a pre-set speed,
wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

20. A method of a hard disk drive, the method comprising:
applying a current to move the magnetic head at a speed with respect to a servo pattern area from an intermediate area of a disk,
detecting a movement speed and a position of the magnetic head, and
adjusting the current to a second current according to the detected movement speed and position and the speed corresponding to the current such that the movement speed converges to a pre-set speed of the servo pattern area,
wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

21. A method of a hard disk drive, the method comprising:
moving a magnetic head with respect to an intermediate area of a disk according to a closed loop control method; and
moving the magnetic head with respect to a servo pattern area of the disk according to a servo pattern search method, the servo pattern search method comprising:
applying a current to move the magnetic head at a speed, detecting a movement speed and a position of the magnetic head, and
adjusting the current to a second current according to the detected movement speed and position and the speed corresponding to the current such that the movement speed converges to a pre-set speed of the servo pattern area,
wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

22. The method of claim 21, wherein the adjusting the current to the second current comprises:
increasing the current to the second current when the detected movement speed is lower than the speed of the current.

23. The method of claim 21, wherein the adjusting the current to another current comprises:
decreasing the current to the second current when the detected movement speed is lower than the speed of the current.

24. The method of claim 21, wherein the servo pattern search method comprises:
detecting another movement speed and another position of the magnetic head; and
adjusting the second current to another current according to the detected another movement speed and position and the second speed corresponding to the second current such that the movement speed converges to the preset speed of the servo pattern area.

25. The method of claim 21, wherein the movement speed and the position of the magnetic head comprises the movement speed and the position of the magnetic head with respect to the servo pattern area.

26. The method of claim 21, wherein the detecting of the movement speed and the position of the magnetic head comprises detecting the movement speed and the position of the magnetic head when the magnetic head moves from the intermediate area to the servo pattern area.

27. An apparatus to control a hard disk drive, comprising:
a magnetic head to move with respect to a disk; and
a controller to control the magnetic head to move with respect to an intermediate area of a disk according to a closed loop control method, and to move with respect to a servo pattern area of the disk according to a servo pattern search method, wherein the controller applies a current to move the magnetic head at a speed, detects a movement speed and a position of the magnetic head, and adjusts the current to a second current according to the detected movement speed and position and the speed corresponding to the current such that the movement speed converges to a preset speed of the servo pattern area, according to the servo pattern search method, wherein the speed of the magnetic head is measured using a back electromotive force of a voice coil motor (VCM), and the back electromotive force of the VCM is measured by measuring a voltage across the voice coil when the search current applied to the voice coil and a differential value of the current converge to 0.

* * * * *